US012606422B2

(12) United States Patent
Maier et al.

(10) Patent No.: US 12,606,422 B2
(45) Date of Patent: Apr. 21, 2026

(54) LIFTING GEAR, AND METHOD FOR DETERMINING SLACK ROPE ON THE LIFTING GEAR

(71) Applicant: LIEBHERR-WERK BIBERACH GMBH, Biberach an der Riss (DE)

(72) Inventors: Clemens Maier, Munderkingen (DE); Tobias Englert, Burgrieden (DE)

(73) Assignee: Liebherr-Werk Biberach GmbH, Biberach an der Riss (DE)

(*) Notice: Subject to any disclaimer, the term of this patent is extended or adjusted under 35 U.S.C. 154(b) by 395 days.

(21) Appl. No.: 18/360,578

(22) Filed: Jul. 27, 2023

(65) Prior Publication Data

US 2023/0391588 A1 Dec. 7, 2023

Related U.S. Application Data

(63) Continuation of application No. PCT/EP2022/051897, filed on Jan. 27, 2022.

(30) Foreign Application Priority Data

Jan. 27, 2021 (DE) ..................... 10 2021 101 800.5
Feb. 19, 2021 (DE) ..................... 10 2021 103 934.7

(51) Int. Cl.
*B66C 13/00* (2006.01)
*B66C 13/10* (2006.01)
*B66C 13/16* (2006.01)

(52) U.S. Cl.
CPC ............ *B66C 13/105* (2013.01); *B66C 13/16* (2013.01)

(58) Field of Classification Search
CPC ....... B66C 13/105; B66C 13/16; B66C 13/46; B66C 15/065
See application file for complete search history.

(56) References Cited

U.S. PATENT DOCUMENTS

| | | | | |
|---|---|---|---|---|
| 5,358,219 A * | 10/1994 | Shenk | B66C 13/32 254/269 |
| 2020/0361751 A1* | 11/2020 | Persico | B66C 13/46 |

FOREIGN PATENT DOCUMENTS

| | | | |
|---|---|---|---|
| DE | 2220994 | 11/1973 | |
| DE | 102009041662 | 3/2011 | |
| DE | 102019102828 | 8/2020 | |
| DE | 102019122703 | 2/2021 | |
| EP | 2436637 | 4/2012 | |
| EP | 3670422 A1 * | 6/2020 | B66C 23/84 |
| WO | WO 2000/069771 | 11/2000 | |
| WO | WO 2009/156573 | 12/2009 | |
| WO | WO 2019/210362 | 11/2019 | |
| WO | WO-2021099374 A1 * | 5/2021 | H02K 7/1004 |
| WO | WO 2022/162066 | 8/2022 | |

* cited by examiner

*Primary Examiner* — Emmanuel M Marcelo
(74) *Attorney, Agent, or Firm* — Levine Bagade Han LLP

(57) ABSTRACT

The present invention relates to lifting gear comprising a hoist rope, on which a load-receiving means is provided for receiving and lifting a load, and a determining device for determining slack rope on the hoist rope, wherein the aforementioned determining device comprises an inclination sensor system for detecting an inclination and/or a tilt rate and/or a tilt acceleration of the load-receiving means and provides a slack-rope signal if the detected inclination and/or tilt rate and/or tilt acceleration of the load-receiving means exceeds a predetermined limit value.

16 Claims, 2 Drawing Sheets

LIFTING GEAR, AND METHOD FOR DETERMINING SLACK ROPE ON THE LIFTING GEAR

CROSS-REFERENCE TO RELATED APPLICATIONS

This application is a continuation of International Patent Application Number PCT/EP2022/051897 filed Jan. 27, 2022, which claims priority to German Patent Application Numbers DE 10 2021 101 800.5 filed Jan. 27, 2021 and DE 10 2021 103 934.7 filed Feb. 19, 2021, all of which are incorporated herein by reference in their entireties.

BACKGROUND

The present invention relates to a lifting gear comprising a hoist rope having a load-receiving means for receiving and lifting a load, and a determining device for determining slack rope on the hoist rope. The invention also relates to a method for determining slack rope on such lifting gear.

In the case of lifting gear such as tower cranes or other cranes for construction sites, maritime applications or other purposes, the machine operator normally takes care manually or visually that the load hook or load-receiving means is lowered not much enough so as not to result in slack rope. This is because such slack rope formation the proper rope guidance would no longer be ensured, which can lead to problems in various areas of the hoist rope system.

On the one hand, problems can arise at the load-receiving means itself, where the hoist rope is usually reeved and deflected around a lower block or one or more deflection pulleys. If the lower block is lowered too much, it will touch the ground and proper rope guidance can no longer be ensured. When tightening again, the lower block can tilt and, in the worst case, rotate 1800 around the boom axis. This means that the hoist rope is no longer guided upwards over the deflection pulleys and can be damaged by stripping on the lower block. At the very least, the lower block must then be cleaned and manually moved back into the correct position.

Even if tipping does not occur during reattachment, the hoist rope can still be damaged by contamination if, for example, gravel, sand or soil with granular substances attaches itself to the rope lying on the ground. As a result, damage to the deflection pulleys may also occur. Depending on the movement of the lifting gear, an actuation of the other drives of the lifting gear can also cause the lower block to be dragged along the ground, which can lead to further damage to the lower block and the hoist rope, for example, if the lifting gear performs a rotational movement with its boom from which the hoist rope runs off, causing the load-receiving means to be dragged along the ground.

On the other hand, there may also occur problems in the area of the hoist winch. If, for example, slack rope builds up on the hoist drum as a result of the load hook touching the ground or due to a blocked hoist rope or a blocked deflection pulley, which may, for example, be frozen, this will lead to improper winding either directly or, at the latest, when the hoist rope is tightened again. If the hoist rope is wound up in multiple layers on the hoist drum, the hoist rope can easily cut between two rope courses of an underlying layer of rope that is not wound up quite tightly during winding, resulting in faster wear or even damage to the rope due to the improper winding. In addition, jerky loads can also cause further damage, such as defective ball bearings on the deflection pulleys.

Even by attentive work of the machine operator, said forming of slack rope can still occasionally occur, for example, when the load hook is lowered behind the edge of a building in an area that cannot be seen. In addition, there can also come to attention errors due to tiring activities such as repetitive lifting distances.

It has therefore already been considered to generally limit the lowering depth of the load hook in order to prevent the lower block from touching the ground by scaling a maximum lowering depth for the respective construction site. However, the problem arises here that the construction site environment is usually not level in practice, so that the lowering depth would have to be defined differently in different areas, which can be a complex process depending on the construction site. In addition, the environment around the construction site is subject to constant changes as the construction work is progressing. For example, if a crane has to lift loads into a pit or onto a roof, the load-receiving means may rest on different levels due to the different heights of the pit floor and the roof, especially if the pit level or roof height changes as the job site progresses.

The present invention is based thereon on the task of creating an improved lifting gear as well as an improved method for determining slack rope, which avoid the disadvantages of the prior art and can further develop the latter in an advantageous manner. In particular, the goal is to create a reliable slack rope detection system that can reliably detect slack rope even in complex hoist environments with changing environmental contours without the need for time-consuming mapping of the environment that must be repeatedly updated, and also for other slack rope problems such as deflection pulleys that freeze.

SUMMARY

Said task is solved, according to the invention, with a lifting gear and a method. Preferred embodiments of the invention are the subject-matter of the dependent claims.

Thus, according to a first aspect, it is proposed to monitor the tilt of the load-receiving means and to use it as an indicator of slack rope. If the load-receiving means tilts too much and/or too fast, it is assumed that the hoist rope is no longer properly tensioned and slack rope has formed. According to the invention, the determining device for determining slack rope comprises an inclination sensor system for detecting an inclination and/or a tilt rate and/or a tilt acceleration of the load-receiving means and provides a slack-rope signal when the detected inclination and/or a tilt rate and/or a tilt acceleration of the load-receiving means exceeds a predetermined value.

The limit value for the inclination and/or angular velocity and/or angular acceleration is advantageously selected in such a way that "normal" inclinations or angular velocities or accelerations, such as occur during pendulum movements of the hoist rope or rotational movements of the boom, do not trigger the slack-rope signal during operation and are not interpreted by the determining device as an indicator of slack rope formation. Only when the load-receiving means, for example the lower block of the load hook, undergoes a tilting that exceeds the normal pendulum movements or rotational travels of the load-receiving means in terms of tilting angle and/or angular velocity and/or angular acceleration, is the slack-rope signal provided. The limit value mentioned is thus chosen sufficiently large in particular to avoid causing a false response during pendulum movements.

For example, a tilt angle of the lower block of a few degrees with respect to the vertical can be interpreted as a normal pendulum motion, while a tilt of more than 100 or more than 200 with respect to the vertical can be interpreted as touching down on the ground or an obstacle, respectively, and then emitting a slack-rope signal.

Alternatively or additionally, very small angular velocities of, for example, only one degree per second, such as occur when a load hook swings back and forth by, for example, 5° in, for example, ten seconds, can be interpreted as normal pendulum motion, while the determining device can interpret higher angular velocities of several, for example 100 per second, as the load hook hitting the ground and then outputting a slack-rope signal.

In an advantageous further development of the invention, a limit value can be specified for each of the parameters mentioned, i.e. angle of inclination and angular velocity, and optionally also angular acceleration, so that a slack-rope signal is output when one of the parameters mentioned reaches or exceeds the limit value.

Advantageously, the limit values for the above-mentioned parameters can also be dynamically adjusted as a function of one another, for example in such a way that if the limit value for the angle of inclination is just missed and the limit value for the angular velocity of the load-receiving means is just missed at the same time, a slack-rope signal is nevertheless output. For example, if the load-receiving means tilts very quickly and does not in itself reach the limit value, but is close to it, the limit value for the angle of inclination can be lowered a little so that a slack-rope signal can optionally be emitted if several variables are close to their limit value.

The slack-rope signal provided by the determining device can basically be further processed in various ways. In the case of possibly only semi-automatic control or further processing, said slack-rope signal can be output by a display device, for example in the form of a warning flash signal on a display and/or in the form of an acoustic warning signal for the machine operator, who can then stop the drives.

Alternatively, or additionally, the lifting gear can advantageously also include a control device which, when said warning signal is present, i.e. when the determining device has determined slack rope, automatically shuts down at least the hoist drive for the hoist rope or blocks lowering movements in order to stop further lowering of the hoist rope. Advantageously, when the slack-rope signal is present, the control device can generally switch off all drives of the lifting gear or block movements that would result in further lowering of the load-receiving means and/or cause the load-receiving means to drag along above the ground. For example, luffing of a boom can be stopped and/or movement of a trolley, from which the hoist rope runs, along the boom and/or rotation of the boom about an upright axis can be stopped or prevented to prevent the load-receiving means from dragging along the ground.

In general, when the slack-rope signal is present, the control device can only allow hoist movements that reduce slack rope and/or tighten the hoist rope and/or do not allow the hoist rope or load-receiving means to drag along the ground. In particular, the control device can allow upward movements of the hoist rope drive and/or boom and prevent contrary hoist movements that could create even more slack rope and/or cause the load-receiving means to drag along the ground.

In an advantageous further development of the invention, said inclination sensor system, with the aid of which the angle of inclination of the load-receiving means relative to the vertical and/or the angular velocity and/or the angular acceleration of the load-receiving means is detected, can comprise at least one sensor element which is attached to the load-receiving means and follows the tilting movements of the load-receiving means. By attaching the at least one inclination sensor to the load-receiving means itself, the inclination or the angular speed or the angular acceleration can be determined directly and without time offset, thus enabling the precise determination of slack rope. At the same time there can be avoided problems such as an interruption of the "field of view" or the detection range of the sensor system, which can occur with sensors arranged at a distance from the load hook.

The sensor can be attached to various portions of the load-receiving means, such as the storage rack for a deflection bottle, a portion of the load hook, or a cladding portion around the bottle storage rack.

Signal transmission from the sensor element on the load-receiving means to the evaluation device of said determining means, which can be part of the hoist control device, for example, can advantageously be wireless, for example via radio, WLAN or Bluetooth or another wireless signal transmission standard. Alternatively or additionally, however, a line-based transmission to the evaluation device can also take place, for example via the hoist rope itself. Alternatively, however, it is also possible to carry out the evaluation in or on the sensor element, in which case the said evaluation device can be arranged on the sensor element.

The inclination sensor system can detect inclinations of the load-receiving means monoaxially or preferably multiaxially and advantageously be configured to at least detect tilting of the load-receiving means about one or preferably two mutually perpendicular, in each case horizontally aligned tilting axes.

Advantageously, the inclination sensor system can include an inertial measurement unit on the load-receiving means, sometimes referred to as an IMU.

Such an inertial measurement unit attached to the load-receiving means may in particular comprise acceleration and rotation rate sensor means for providing acceleration signals and rotation rate signals indicating, on the one hand, translational accelerations along different spatial axes and, on the other hand, rotation rates or gyroscopic signals with respect to different spatial axes. Rotational speeds, but generally also rotational accelerations, or also both, can here be provided as rotational rates.

Advantageously, the inertial measurement unit can measure accelerations with respect to three spatial axes and rotation rates about at least two or preferably also three spatial axes. The accelerometer sensor means may be configured to operate triaxially and the gyroscope sensor means may be configured to operate bi- or triaxially. In particular, the gyroscope sensor means can be configured to detect rotation rates with respect to two mutually perpendicular, respective horizontal axes in order to detect lateral tilting movements and forward or backward pitching movements of the load-receiving means. In-itself twists along the hoist rope axis are less interesting for the detection of slack rope formation.

Advantageously, at least the inclination of the load-receiving means relative to the vertical is determined from the signals of said inertial measurement unit, whereby for this purpose, e.g. by means of a complementary filter or another filter, high-frequency components from the gyroscope signals and low-frequency components from the direction of the gravitational vector can be determined and combined in a complementary manner to determine the tilt of the load-receiving means. However, other evaluations of the signals from the inertial measurement unit are also possible.

According to another aspect of the present invention, determining slack rope can also be achieved or refined by having a load sensor system detect the load acting on the hoist rope and/or the rope force present in the hoist rope, wherein the determining device can provide the slack-rope signal when a decrease and/or a rate of decrease of the detected load and/or the detected rope force exceeds a predetermined limit value.

In principle, it would also be possible to assume slack rope and provide a slack-rope signal if the detected load alone or the detected rope force itself drops below a certain limit value, for example towards zero. However, since this requires a relatively high accuracy of the load and/or force sensor, it is advantageous to monitor the pickup speed or its derivative and compare it with a limit value in order to provide a slack-rope signal, especially in the event of a very strong or very rapid drop, since it can then be assumed that the load-receiving means has hit the ground or that the lower block has been jerkily lifted on or off.

In particular, the aforementioned comparison of the detected inclination or the detected inclination speed of the load or the rope force with a corresponding limit value can be linked with the aforementioned checking and monitoring of the inclination or angular speed or angular acceleration of the load-receiving means in order to achieve, as it were, a refinement of the determination of slack-rope-inducing circumstances. This allows reliable statements to be made about the presence of slack rope even with limited measuring accuracy with regard to the hoist rope force or the load acting on the hoist rope.

Typically, the measuring accuracy of load sensing axes installed in deflection bottles is relatively limited, so that the detected load value at the load sensing axis could only detect a contact of the relatively light lower block or load hook on the ground with limited reliability and speed. Another complicating factor is that the lowering depth and thus the rope weight are typically not exactly known or measured. If the measuring signal of the load sensor system and its evaluation, i.e. the comparison of the decrease or the decrease speed of the detected load or rope force with a limit value, is combined or merged with the evaluation of the inclination or angular speed or angular acceleration of the load-receiving means, an overall even safer slack rope detection can be implemented.

Said load sensing system can comprise at least one load sensing axis, which can be installed, for example, on the lower block where the hoist rope is deflected on the load-receiving means, so that the load signal indicates the weight of the load-receiving means and optionally the load attached to it, essentially independently of the lowering depth.

Alternatively, or additionally, however, a load sensing axis can be provided, for example on the deflection pulley, via which the hoist rope is let down from the boom.

Alternatively or additionally, other load sensor systems can be installed, for example strain gauges on a trolley or other sensor elements.

Independently thereof, a load signal can advantageously be transmitted wirelessly to the evaluation device of the determining device.

Wireless signal transmission makes it easy to retrofit the sensor system for the determining device and thus provide slack rope detection on older cranes or lifting gear.

According to a further aspect, the slack rope determination may also comprise an acceleration sensor system, by means of which the accelerations at two different portions of the hoisting rope system may be detected in order to be able to conclude that a slack rope has been formed if the accelerations deviate from each other. Advantageously, said acceleration sensor system is configured to detect, on the one hand, an acceleration of a hoist rope system portion in the area of the load-receiving means and, on the other hand, the acceleration of a hoist rope system portion in the area of the hoist rope drive or hoist rope winch, since by detecting the accelerations in the end portions of the hoist rope system, there can be detected slack rope-related problems in the entire intermediate area, for example due to jammed or frozen deflection pulleys or jammed hoist rope system portions or similar.

In particular, the acceleration sensor system can be configured to detect the acceleration of the hoist drive or hoist winch or hoist drum itself and, on the other hand, to detect the acceleration of the load-receiving means, for example the lower block. The actual recording can be done in different ways. For example, a deflection pulley speed could be determined at the lower block, since a certain hoist rope speed would induce a certain deflection pulley speed if the rope was running correctly. In particular, however, an acceleration sensor system can also be fitted to the lower block or to the load-receiving means, which can detect vertical or at least approximately upright accelerations in order to be able to directly determine the accelerations when lowering or raising the load-receiving means.

In the hoist drive or hoist winch area, for example, a rotation speed sensor can be provided on the hoist drum, optionally combined with a winding layer sensor, in order to be able to detect the influence of the winding layers on the rope speed. Alternatively, or additionally, however, an acceleration sensor system can be provided which, for example, detects the rope speed running directly from the drum and determines the acceleration in the hoist drive area from its derivation.

Alternatively or additionally, the acceleration of the load can also be determined via the load sensor system. The equation $F=m*a$, i.e. force=mass*acceleration, results in a higher hoist rope force during acceleration and a lower one during braking. The acceleration of the load can be determined from the change in hoist rope force.

The determining device for determining slack rope can be configured to compare the acceleration of the hoist drive or at the hoist winch with the acceleration at the load-receiving means, whereby reduction or transmission factors due to the reeving of the hoist rope at the lower block or at other rope sections can be taken into account in this comparison. If, for example, the load hook is simply reeved, the rope acceleration at the hoist winch is halved up to the load hook, so that the hoist rope itself runs correctly when half the acceleration occurs at the load hook compared to the rope acceleration at the hoist winch.

For example, if a hoisting motion is specified by the control system, such as "unwind hoist", the hoist winch unwinds the hoist rope, initially accelerating the winch and hoist rope. This in turn must in itself cause proportional acceleration of the load hook or lower block or load-receiving means. However, if these two accelerations deviate from each other, it must be assumed that a deflection or the hoist rope is blocked in the rope drive, especially if the deviation between the two accelerations exceeds a predetermined level. For example, the hoist rope could be frozen to a deflection pulley, resulting in slack rope on the hoist drum when the hoist drum unwinds.

If the determining device detects an excessive difference in acceleration, a slack-rope signal can be output, which can then be processed in the aforementioned manner by the control device to switch off the hoist drive or optionally also another crane drive.

To refine the comparison between the acceleration at a hoist winch and the acceleration at the load-receiving means, optionally further accelerations induced by movements of other hoist elements at the load-receiving means can be detected and taken into account in the comparison. If, for example, a crane boom is also luffed in parallel with the operation of the hoist winch, if the course of the hoist rope is correct, in addition to the acceleration from the hoist winch movement there should also be a downward acceleration due to the boom movement. For this purpose, the determining device can also have an acceleration sensor system for detecting the acceleration of such additional crane elements as, for example, the crane boom, and take this into account when comparing the acceleration of the load-receiving means with the acceleration at a hoist winch.

Alternatively, or in addition to a comparison of two accelerations at different points on the hoist rope system, in further development of the invention, a comparison of two velocities at different points in the hoist rope system may be provided to detect slack rope. For example, a rotary encoder on the hoist motor or the hoist cable winch can provide a speed on the hoist drive and another rotary encoder, for example on the lower block on the load hook, can provide the speed signal there.

Alternatively, or additionally, an acceleration signal from the aforementioned IMU can also be integrated over a limited period of time, for example over the entire acceleration process, in order to determine the speed of the lower block and to compare it with the speed at another hoist rope section, for example the speed at the hoist drive, in order to determine slack rope from this.

Advantageously, such an integration can only be performed over a limited period of time to avoid instabilities that would be caused by a permanent integration due to offsets in the sensor values. Alternatively, however, the offsets could be estimated, improving integration during the acceleration phase.

Furthermore, it would be possible to provide for further integration and to check the positions at various points in the hoist winch system, for example via absolute encoders on the hoist drive, on the hoist winch and/or on a deflection pulley of the hoist winch system, for example a deflection pulley on the hook. In particular, it is possible to determine a change in position within a certain period of time, which in itself enables slack rope detection analogous to speed matching.

BRIEF DESCRIPTION OF THE DRAWINGS

The present invention is explained in more detail below with reference to preferred embodiments and the corresponding drawings. In the drawings show.

DETAILED DESCRIPTION

Figure 1:
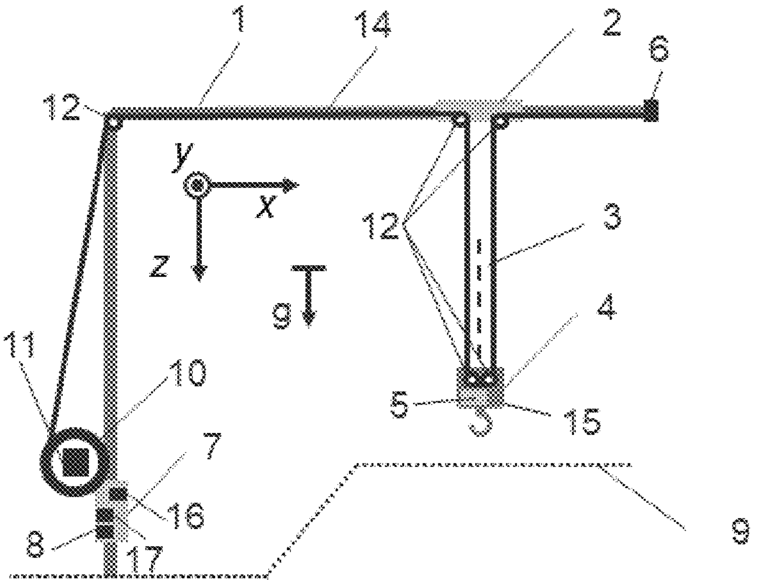
FIG. 1: a lifting gear in the form of a tower crane in a side view, the lifting gear being shown in normal operation with only a very small angle of inclination of the load-receiving means.

As shown in the figures, the lifting gear 1 may be configured as a tower crane, for example, and comprise a boom 14 along which a trolley 2 is movable, from which a hoist rope 3 runs. Said boom 14 can, in the case of a tower crane, be seated on a tower, and the tower or boom may be rotatable relative to the tower about an upright axis, for example by a slewing gear. It is understood, however, that the lifting gear may be configured to be of another type of crane, for example, a telescopic boom crane with a boom that can be luffed up and down, or a derrick crane, maritime crane, loader crane, or other type of hoist.

The hoist rope 3 can be wound up and unwound by a hoist winch 10 and thus tightened and let down, wherein a hoist winch drive 11 can drive the hoist winch 10 and be controlled by a control device 7 of the lifting gear 1.

The hoist rope 3 carries a load-receiving means 15, which may comprise a load hook, for example, but also a lifting magnet or stop ropes. Independently of this, the hoist rope 3 can be reeved on the load-receiving means 15, which can have a lower block 4 for this purpose, see FIG. 1 or FIG. 4. As the figures show, the hoist rope 3 can be deflected around various deflection sheaves or pulleys 12.

In order to be able to detect the formation of slack rope in the area of the hoist rope 3, the lifting gear 1 can have a determining device 16, which can be part of the control device 7. Independently of this, the determining device 16 can be configured to operate electronically in the same way as the control device 7, for example to have a microprocessor and a program memory in order to be able to process a determining program stored in the memory with appropriate algorithms.

The determining device 16 receives sensor signals which can be evaluated by evaluation means 17 of the determining device 16, which may be configured to software program means, for example, for the presence of certain characteristics.

Figure 2:
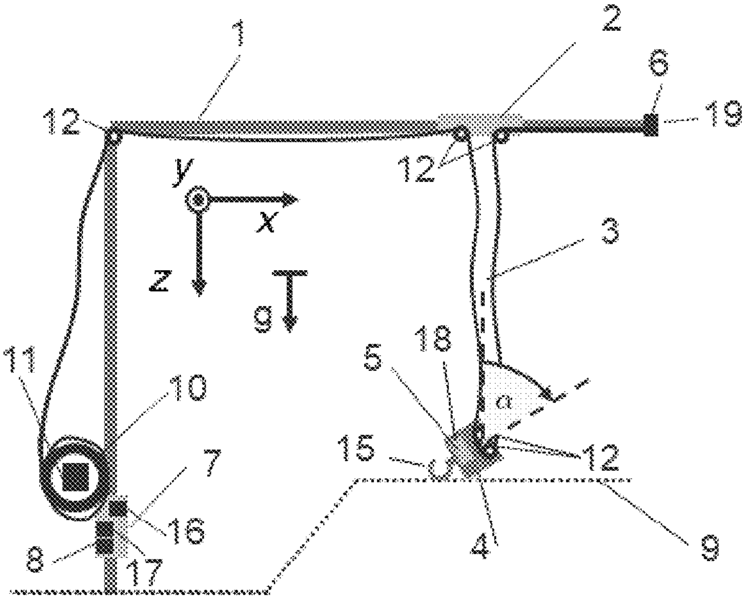
FIG. 2: the lifting gear of FIG. 1 with the load-receiving means resting on the ground and the relatively large angle of inclination of the load-receiving means and the resulting slack rope formation.
Figure 3:
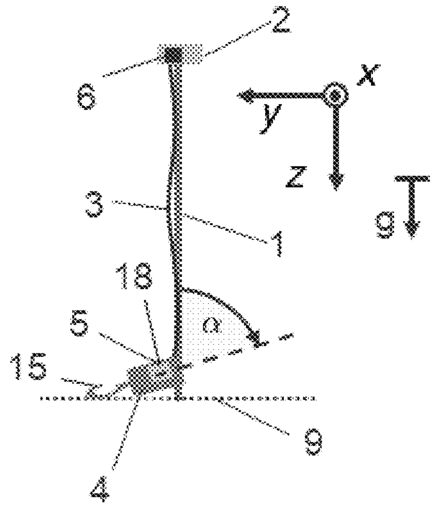
FIG. 3: a front view of the crane or lifting gear of FIG. 2, showing a lateral tilt of the load-receiving means resting on the ground and the corresponding strong angle of inclination.

In this regard, the determining device 16 can receive signals from an inclination sensor system 18 that can detect or determine an inclination angle α of the load-receiving means 15 relative to the vertical and/or relative to a natural static orientation of the load-receiving means, cf. FIG. 2 and FIG. 3. Said inclination sensor system 18 thereby comprises at least one inclination sensor element, which may be attached to the load-receiving means 15 in order to follow and itself experience the tilts or inclinations of the load-receiving means 15.

In particular, said inclination sensor system 18 may include a so-called IMU 5, i.e., an inertial measurement unit on the load-receiving means 15 that provides acceleration signals and rotation rate signals that characterize or reflect acceleration and rotation rates at the load-receiving means 15.

Said inclination sensor system 18, in particular said IMU 5, is thereby advantageously configured to detect inclinations and/or tilts and/or rotational speeds and/or accelerations about at least one horizontal axis of rotation, preferably about two horizontal axes of rotation perpendicular to each other. By means of a two-axis inclination and/or rotation rate and/or rotation acceleration detection, in particular a lateral tilting of the load-receiving means 15, as shown in FIG. 3, and also a forward or backward pitching of the load-receiving means 15, as shown in FIG. 2, can be detected. In particular, the inclination sensor system 18 can detect at least one tilt about a tilting axis parallel to the deflection axis of the lower block 4 and one tilt about a horizontal tilting axis perpendicular thereto.

Advantageously, the rotation rates can also be detected triaxially. Similarly, translational accelerations can also be triaxially detected. Advantageously, said IMU 5 can detect translational accelerations with respect to three axes and also rotational rates or rotational accelerations with respect to three axes.

In normal hoist operation, as shown in FIG. 1, most of the acceleration due to gravity g acts in the Z direction, cf FIG. 1, so that the angle α of the load-receiving means 15 with respect to the vertical is usually zero or very small. The hoist rope 3 generally oscillates only a few degrees relative to the vertical, so that the angle of inclination of the load-receiving means 15 is also correspondingly small.

However, when the load-receiving means 15 touches the ground, as shown in FIG. 2 and FIG. 3, the orientation of the load-receiving means 15 changes significantly. The angle of inclination a with respect to the vertical becomes relatively large and also changes very rapidly when the lower block 4 touches down on the substrate 9.

If the inclination sensor system 18 detects such an inclination angle α exceeding a predetermined limit value and/or a tilt rate and/or tilt acceleration exceeding a predetermined limit value for the tilt rate or tilt acceleration, which can be determined by said evaluating device 17 by comparison, the determining device 16 can assume that slack rope is forming and output a corresponding slack-rope signal.

The control device 7 can switch off the hoist drive 11 when such a slack-rope signal is present and, if necessary, also switch off other lifting gear drives 8, such as a slewing drive or a luffing drive for the boom 14, in order to prevent further lowering of the load-receiving means 15 or dragging of the load-receiving means 15 over the ground.

Advantageously, the control device 7 can block all hoist movements when the determining device 16 has determined slack rope, preferably with the exception of hoist movements that can tighten the hoist rope 3 again, such as by a hoist up movement of the hoist drive 11.

The control device 7 can be configured to block the other lifting gear drives 8 until the hoist rope 3 is tensioned again or the slack rope is eliminated by the hoist up movement, which can be detected, for example, by a decrease or drop of the angle of inclination a by the inclination sensor system 18. If, for example, the angle of inclination a falls below a predetermined limit value, which can be the same as the first limit value mentioned above, but can also deviate from it, for example be smaller, the determining device 16 assumes that there is no longer any slack rope, whereupon the control device 7 can release the lifting gear drives 8 again.

By blocking further lifting gear drives, it is possible to prevent the lower block 4 from dragging on the ground 9, thus avoiding further damage caused by the sticking of pebbles or sand.

Advantageously, the determining device can also receive signals from a load or rope force sensor 19 that provides a load signal characterizing the rope force acting in the hoist rope 3. For example, said load sensor system 19 can comprise a load sensor 6 or a hoist rope sensor that can, for example, detect the rope force of the hoist rope 3 at the attachment point of the hoist rope 3, cf. FIGS. 1-4. Alternatively or additionally to such a rope load sensor 6 at the attachment point of the hoist rope 3, the load sensor system 19 can also comprise, for example, a load sensing axis at the lower block 4 and/or have load sensing axes at other deflection pulleys 12, by means of which there can be determined rope tensile forces or corresponding reaction forces at the deflection pulleys.

If the load signal from the load sensor system 19 characterizing the rope tensile force drops below a predetermined limit value or if the drop rate of said load signal exceeds a predetermined limit value, the determining device 16 can assume that the slack rope has been formed. Said limit value for the load signal can take into account the mass of the load-receiving means 15 including the lower block 4, since when the load-receiving means 15 is suspended, at least the weight of the load-receiving means 15 always pulls on the hoist rope, so that when the load signal drops to a lower value, it can be assumed that the load-receiving means 15 is resting on the lower block 9.

Advantageously, the monitoring of said load signal of the load sensor system 19 is linked to the monitoring of the angle of inclination a, for example in such a way that, in addition to exceeding a limit value for the angle of inclination a and/or for the tilt rate, it is also required that the load signal drops below a predetermined limit value and/or that the drop rate of the load signal rises above a predetermined limit value before the determining device provides the slack-rope signal. If necessary, the limit values can also be dynamically adjusted, as explained at the beginning, in order to output a slack-rope signal, for example, even if the signals from the inclination sensor system 18 and the load sensor system 19 do not yet reach the respective limit value by themselves, but are both just short of it.

Figure 4:
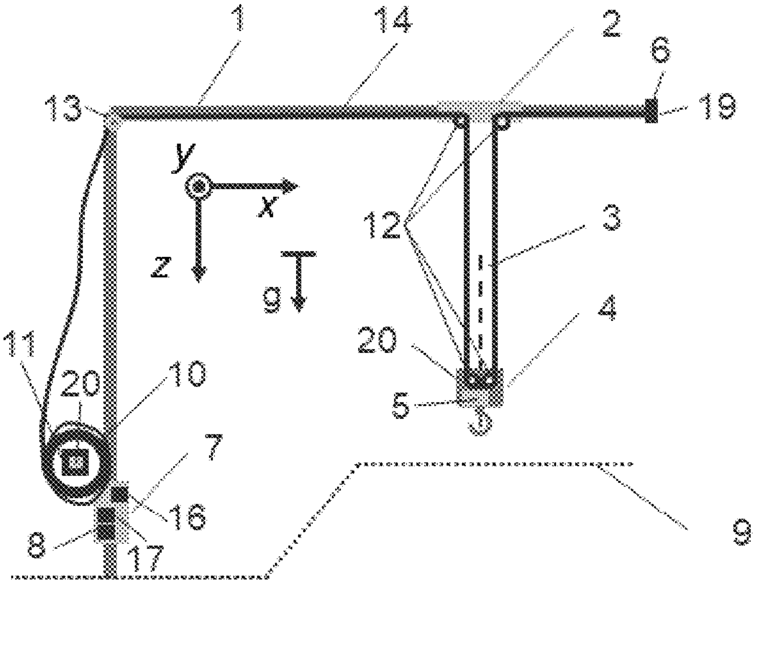
FIG. 4: a side view of the lifting gear of the preceding figures, in which a fixed deflection pulley causes slack rope to be inserted between the hoist winch and the deflection pulley, even though the load-receiving means does not rest on the ground.

As FIG. 4 illustrates, slack rope can form not only when the load-receiving means is resting on the ground 9, but also when the hoist rope 3 is blocked between the hoist winch 10 and the load-receiving means 15, for example by a frozen deflection pulley 13, see FIG. 4. In order to also be able to reliably detect such cases of slack rope formation, the determining device 16 or its evaluation means 17 can compare accelerations at a hoist winch 10 or hoist drive 11 with accelerations at the load-receiving means 15. In proper operation, a predetermined hoist winch or drum acceleration, taking into account the changing lever arm due to multiple layers of winding, induces a certain acceleration of the hoist rope 3 in the area of the hoist winch 10, which then results in a corresponding acceleration at the load-receiving means 15, proportionally changed by the reeving. If these accelerations deviate from each other or do not correspond to the ratio corresponding to the deflection geometry and reeving geometry, it can be assumed that the slack rope has been formed.

Preferably, an acceleration sensor system 20 can detect said accelerations at the hoist winch 10 or hoist drive 11 on the one hand and at the load-receiving means 15 on the other hand, for example by means of a drum sensor for detecting the drum speed or acceleration and a winding layer sensor for detecting the number of winding layers on the drum. A corresponding acceleration sensor system can be attached to the load-receiving means 15, which can detect acceleration in the upright acceleration direction. This can be, for example, the aforementioned IMU 5, which provides corresponding acceleration signals.

The acceleration at a hoist winch 10 and the acceleration at the load-receiving means 15 are compared with each other by the evaluation means 17, whereby the transmission or reduction ratio can be taken into account by the reeving. If the accelerations deviate from each other by a predetermined amount or by a tolerance limit, the determining device 16 can provide a slack-rope signal. When such a slack-rope signal is present, the control device 7 can, in particular, switch off the hoist drive 11 or allow only hoist-up movements.

We claim:

1. A lifting gear comprising:

a hoist rope;

a load receiver on the hoist rope, wherein the load receiver is configured to receive and lift a load; and a determining device for determining slack rope on the hoist rope;

wherein the determining device comprises an inclination sensor system for detecting an inclination and/or a tilt rate and/or a tilt acceleration of the load receiver and is configured to provide a slack-rope signal if the detected inclination and/or tilt rate and/or tilt acceleration of the load receiver exceeds a predetermined limit value; and wherein the determining device comprises an acceleration sensor system for detecting a first acceleration at a hoist winch and/or a hoist drive for the hoist rope and for detecting a second acceleration at the load receiver, and wherein the determining device is configured to provide the slack-rope signal when one of the first or second accelerations deviate from the other of the first or second accelerations above a predetermined amount.

2. The lifting gear of claim 1, wherein the inclination sensor system is configured to detect at least inclinations and/or tilt rates and/or tilt accelerations with respect to a horizontal tilting axis, wherein the inclination sensor system is configured to operate bi- axially or triaxially.

3. The lifting gear of claim 1, wherein the inclination sensor system comprises at least one sensor element attached to the load receiver.

4. The lifting gear of claim 1, wherein the inclination sensor system comprises an inertial measurement unit for providing acceleration signals and rotation rate signals to the load receiver.

5. The lifting gear of claim 1, wherein the determining device comprises a load sensor system for detecting the load acting on the hoist rope and/or for detecting a hoist rope force, and wherein the determining device is configured to provide a slack-rope signal when the detected load and/or the detected hoist rope force drops below a predetermined limit value and/or a drop rate of the detected load and/or hoist rope force exceeds a predetermined limit value.

6. The lifting gear of claim 5, wherein the determining device is configured to provide the slack-rope signal if the limit value for the detected load and/or hoist rope force is reached and the limit value for the inclination and/or a tilt rate and/or a tilt acceleration of the load receiver is reached.

7. The lifting gear of claim 6, wherein the determining device is configured to take into account adapted limit values for the inclination and load signals when the signals of the inclination sensor system and the load sensor system are taken into account in a linked manner.

8. The lifting gear of claim 1, wherein the load sensor system comprises a tensile force sensor and/or load sensor at an attachment point of the hoist rope.

9. The lifting gear of claim 1, wherein the load sensor system comprises a load sensing axis on a lower block of the load receiver or on another deflection pulley of a hoist rope drive.

10. The lifting gear of claim 1, wherein the acceleration sensor system on the hoist winch and/or the hoist drive comprises a rotational rate sensor and optionally a winding layer sensor and on the load receiver has an acceleration sensor for detecting upright accelerations, and wherein the acceleration sensor comprises an inertial measurement unit.

11. The lifting gear of claim 1, wherein the determining device is configured to take into account a proportionality factor corresponding to a course of the hoist rope when comparing the deviation of the first and second accelerations, and wherein the course of the hoist rope comprises a hoist rope reeving.

12. The lifting gear of claim 1, further comprising an accelerometer for determining an acceleration of the load receiver and/or the load from a load signal of a load sensor system on the basis of the equation $F=m*a$ from the changes of the load signal.

13. The lifting gear of claim 1, further comprising a control device configured to automatically switch off and/or block a hoist drive and/or other lifting gear drives in the presence of the slack-rope signal.

14. The lifting gear of claim 13, wherein the control device is configured to only allow hoist movements that tension the hoist rope when the slack-rope signal is present.

15. The lifting gear of claim 14, wherein the hoist movements that tension the rope comprise a hoist up movement of the hoist drive and/or a luffing up movement of a boom.

16. The lifting gear of claim 1, wherein the determining device comprises a wireless communication interface for wirelessly receiving sensor signals.

* * * * *